(12) United States Patent
Hirata et al.

(10) Patent No.: US 10,942,940 B2
(45) Date of Patent: Mar. 9, 2021

(54) SMELL PRESENTATION DEVICE WITH ENVIRONMENT CONDITION-BASED SMELL INTENSITY CORRECTION

(71) Applicant: SONY INTERACTIVE ENTERTAINMENT INC., Tokyo (JP)

(72) Inventors: Shinichi Hirata, Kanagawa (JP); Yoichi Nishimaki, Kanagawa (JP); Hiroshi Osawa, Kanagawa (JP); Kyoko Furumura, Tokyo (JP); Takeshi Yamagishi, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 473 days.

(21) Appl. No.: 15/575,935

(22) PCT Filed: Feb. 12, 2016

(86) PCT No.: PCT/JP2016/054105
§ 371 (c)(1),
(2) Date: Nov. 21, 2017

(87) PCT Pub. No.: WO2016/199452
PCT Pub. Date: Dec. 15, 2016

(65) Prior Publication Data
US 2018/0144033 A1 May 24, 2018

(30) Foreign Application Priority Data
Jun. 12, 2015 (JP) .............................. JP2015-119717

(51) Int. Cl.
*G06F 16/248* (2019.01)
*G06F 16/2457* (2019.01)
(Continued)

(52) U.S. Cl.
CPC .......... *G06F 16/248* (2019.01); *A63F 13/212* (2014.09); *A63F 13/217* (2014.09);
(Continued)

(58) Field of Classification Search
CPC ...... A63F 13/212; A63F 13/217; A63F 13/28; A63F 13/40; G06F 3/011; G06F 16/248
See application file for complete search history.

(56) References Cited

U.S. PATENT DOCUMENTS

2015/0019030 A1* 1/2015 Chandler ........... G06Q 10/0631
700/283
2015/0098867 A1* 4/2015 Aldereguia ............... A61L 9/01
422/83
(Continued)

FOREIGN PATENT DOCUMENTS

JP       05-084284 A     4/1993
JP       05-229769 A     9/1993
(Continued)

OTHER PUBLICATIONS

Nakamoto, Takamichi et al., "Cooking Up an Interactive Olfactory Game Display", Jan./Feb. 2008, IEEE Computer Graphics and Applications, pp. 75-78. (Year: 2008).*
(Continued)

*Primary Examiner* — Scott A. Waldron
(74) *Attorney, Agent, or Firm* — Katten Muchin Rosenman LLP

(57) ABSTRACT

The present invention provides an information processing device capable of properly controlling a smell presentation device by matching a using state. The information processing device acquires information on the using state of the smell presentation device that presents a smell to a user, and
(Continued)

| SUBSTANCE ID | SUBSTANCE NAME | MANUFACTURER NAME | SMELL TYPE INFORMATION | REFERENCE SMELL INTENSITY VALUE | CORRECTION INFORMATION | | INTERACTION INFORMATION | |
|---|---|---|---|---|---|---|---|---|
| #101 | SMELL SUBSTANCE A | MANUFACTURER X | FLOWER, RELAX | 100 | APPLICATION CONDITION 1 | CORRECTION COEFFICIENT 1 | #102 | + |
|  |  |  |  |  | APPLICATION CONDITION 2 | CORRECTION COEFFICIENT 2 | #201 | − |
|  |  |  |  |  | ⋮ | ⋮ | #205 | N |
| #102 | SMELL SUBSTANCE B | MANUFACTURER Y | CURRY | 200 | APPLICATION CONDITION 1 | CORRECTION COEFFICIENT 1 | #101 | + |
|  |  |  |  |  | APPLICATION CONDITION 2 | CORRECTION COEFFICIENT 2 |  |  |
|  |  |  |  |  | ⋮ | ⋮ |  |  |
| ⋮ | ⋮ | ⋮ | ⋮ | ⋮ | ⋮ |  | ⋮ |  | causes the smell presentation device to present a smell in a mode determined in accordance with the acquired information on the using state.

8 Claims, 4 Drawing Sheets

(51) Int. Cl.
    *A63F 13/212* (2014.01)
    *A63F 13/28* (2014.01)
    *A63F 13/79* (2014.01)
    *G06F 3/01* (2006.01)
    *A63F 13/217* (2014.01)
    *A63F 13/25* (2014.01)
    *A63F 13/35* (2014.01)
    *A63F 13/40* (2014.01)

(52) U.S. Cl.
    CPC .............. *A63F 13/25* (2014.09); *A63F 13/28* (2014.09); *A63F 13/35* (2014.09); *A63F 13/40* (2014.09); *A63F 13/79* (2014.09); *G06F 3/011* (2013.01); *G06F 16/24575* (2019.01)

(56) References Cited

U.S. PATENT DOCUMENTS

| | | | | |
|---|---|---|---|---|
| 2015/0297778 | A1* | 10/2015 | Conroy | B05B 7/2416 239/11 |
| 2015/0308996 | A1* | 10/2015 | Kim | G01N 33/0001 73/23.34 |
| 2016/0022854 | A1* | 1/2016 | Shah | A61L 9/03 392/387 |

FOREIGN PATENT DOCUMENTS

| | | |
|---|---|---|
| JP | 2000-99239 A | 4/2000 |
| JP | 2003-13089 A | 1/2003 |
| JP | 2004-357972 A | 12/2004 |
| JP | 2008-270923 A | 11/2008 |
| JP | 2010-257126 A | 11/2010 |
| JP | 2012-32066 A | 2/2012 |
| JP | 2014-92673 A | 5/2014 |
| WO | 2007/105694 | 9/2007 |
| WO | 2015/025511 A1 | 2/2015 |

OTHER PUBLICATIONS

International Preliminary Report on Patentability dated Dec. 21, 2017, from the corresponding PCT/JP2016/054105.
Notification of Reasons for Refusal dated Jun. 5, 2018, from the corresponding Japanese Application No. 2017-523126.
Notification of Reasons for Refusal dated Oct. 29, 2019, from the corresponding Japanese Application No. 2018-220726, 3 sheets.
Decision of Refusal dated Aug. 28, 2018, from Japanese Application No. 2017-523126, 7 sheets.
Masaaki Miyaura et al., "Work Support System Using Olfactory Display", Technology Report by The Institute of Image Information and Television Engineers, The Institute of Image Information and Television Engineers, Jun. 29, 2010, vol. 34, No. 25, p. 137 to 142.
International Search Report and Written Opinion dated Mar. 15, 2016, from the corresponding PCT/JP2016/054105.

* cited by examiner

FIG. 2

| SUBSTANCE ID | SUBSTANCE NAME | MANUFACTURER NAME | SMELL TYPE INFORMATION | REFERENCE SMELL INTENSITY VALUE | CORRECTION INFORMATION | | INTERACTION INFORMATION | |
|---|---|---|---|---|---|---|---|---|
| | | | | | APPLICATION CONDITION | CORRECTION COEFFICIENT | | |
| #101 | SMELL SUBSTANCE A | MANUFACTURER X | FLOWER, RELAX | 100 | APPLICATION CONDITION 1<br>APPLICATION CONDITION 2<br>... | CORRECTION COEFFICIENT 1<br>CORRECTION COEFFICIENT 2<br>... | #102 +<br>#201 −<br>#205 N | |
| #102 | SMELL SUBSTANCE B | MANUFACTURER Y | CURRY | 200 | APPLICATION CONDITION 1<br>APPLICATION CONDITION 2<br>... | CORRECTION COEFFICIENT 1<br>CORRECTION COEFFICIENT 2<br>... | #101 + | |
| ... | ... | ... | ... | ... | ... | ... | ... | |

FIG.5

| USER ID | USER CORRECTION INFORMATION ||
|---|---|---|
| userA | #101 | 2 |
| | #102 | 0 |
| | #201 | −3 |
| | ⋮ | ⋮ |
| userB | #101 | 3 |
| | #102 | −1 |
| | #201 | −1 |
| | ⋮ | ⋮ |
| ⋮ | ⋮ ||

SMELL PRESENTATION DEVICE WITH ENVIRONMENT CONDITION-BASED SMELL INTENSITY CORRECTION

TECHNICAL FIELD

The present invention relates to an information processing device that controls a smell presentation device which presents a smell to a user, an information processing method, a control program of the information processing device, and an information storage medium.

BACKGROUND ART

In a video game, for example, there has been studied utilization of a smell presentation device that presents a specific smell to a user, for the purpose of making the user experience a realistic feeling.

SUMMARY

Technical Problem

Our perception of a smell is different depending on an individual person. Also, how we perceive the smell is different depending on a using environment of the smell presentation device. Conventionally, such a difference in the use of the smell presentation device has not been sufficiently considered.

The present invention has been made in consideration of the above situation. One object of the present invention is to provide an information processing device, capable of properly controlling a smell presentation device by matching various using states, an information processing method, a control program for the information processing device, and an information storage medium.

Solution to Problem

An information processing device according to the present invention is an information processing device for controlling a smell presentation device that presents a smell to a user. The information processing device includes an acquiring unit that acquires information on a using state of the smell presentation device, and a control unit that causes the smell presentation device to present a smell in a mode determined in accordance with the acquired information on a using state.

An information processing method according to the present invention is an information processing method for controlling a smell presentation device that presents a smell to the user. The information processing method includes a step of acquiring information on a using state of the smell presentation device, and a step of causing the smell presentation device to present a smell in a content adjusted in accordance with the acquired information on a using state.

A program according to the present invention is a program for controlling a smell presentation device that presents a smell to a user. The program is for causing a computer to function as acquiring means for acquiring information on a using state of the smell presentation device, and control means for causing the smell presentation device to present a smell in a content adjusted in accordance with the acquired information on a using state. This program may be provided by being stored in a computer-readable information recording medium.

BRIEF DESCRIPTION OF DRAWINGS

FIG. 2 is a diagram depicting an example of a smell substance database.

FIG. 5 is a diagram depicting an example of a user database.

DESCRIPTION OF EMBODIMENT

Hereinafter, an embodiment of the present invention will be described in detail with reference to the drawings.

Figure 1:
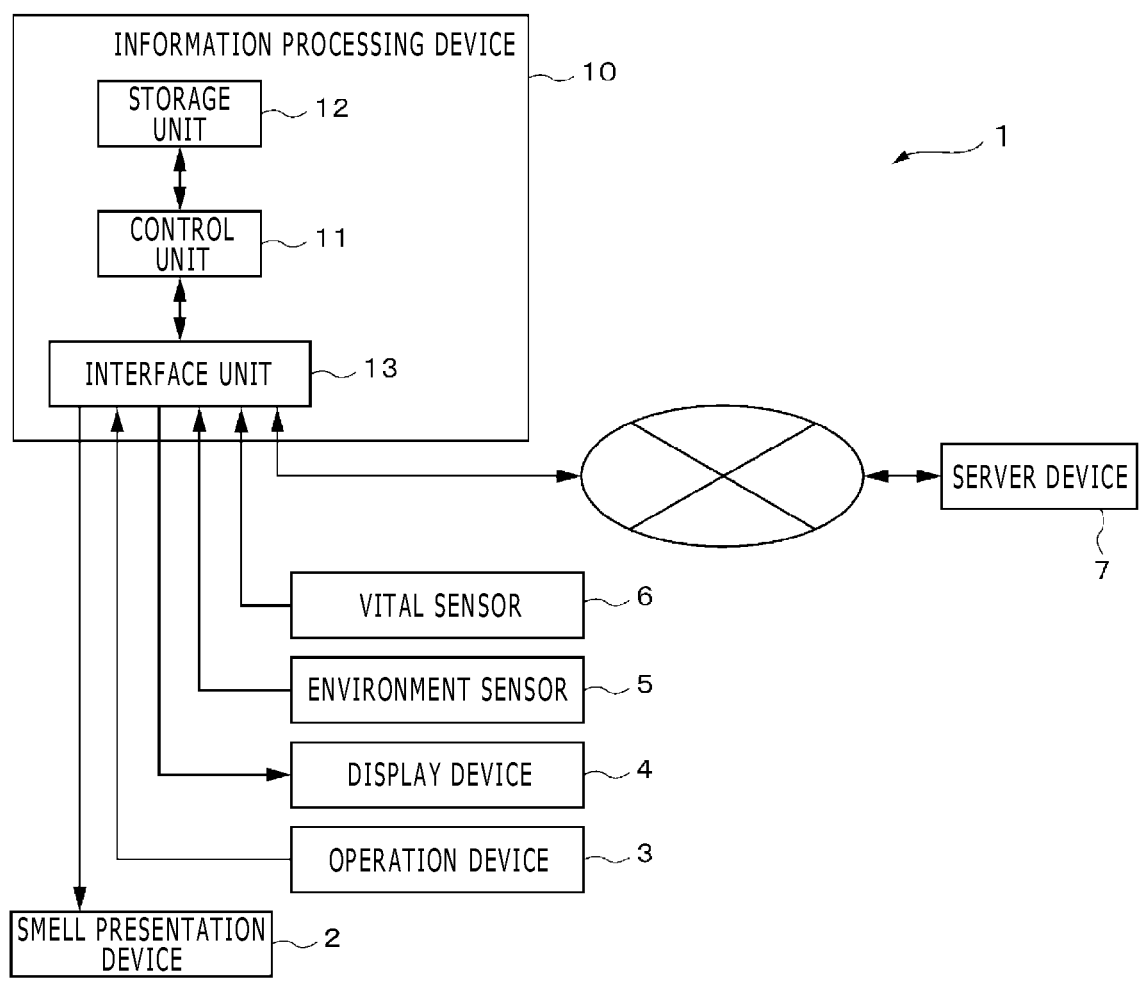
FIG. 1 is an overall schematic diagram of a smell presentation system including an information processing device according to an embodiment of the present invention.

FIG. 1 is a configuration block diagram depicting a smell presentation system 1 including an information processing device 10 according to an embodiment of the present invention. As depicted in the drawing, the smell presentation system 1 is configured to include the information processing device 10, a smell presentation device 2, an operation device 3, a display device 4, an environment sensor 5, a vital sensor 6, and a server device 7.

The information processing device 10 may be a home-use game machine, a portable game machine, a personal computer, a smart phone, or a tablet, for example. As depicted in FIG. 1, the information processing device 10 is configured to include a control unit 11, a storage unit 12, and an interface unit 13.

The control unit 11 is a central processing unit (CPU) or the like, and executes various information processing, by executing a program stored in the storage unit 12. A detailed example of processing executed by the control unit 11 in the present embodiment will be described later. The storage unit 12 includes a memory device such as a random access memory (RAM), and stores the program to be executed by the control unit 11 and stores data processed by the program.

The interface unit 13 is a communication interface for exchanging various data between the smell presentation device 2, the operation device 3, the display device 4, the environment sensor 5, the vital sensor 6, and the server device 7. The information processing device 10 is connected, by either wire or wireless, to the smell presentation device 2, the operation device 3, the display device 4, the environment sensor 5, and the vital sensor 6, via the interface unit 13. Further, the information processing device 10 is connected to the server device 7 so as to be able to communicate with each other, via a communication network such as a local area network (LAN) and the internet.

The smell presentation device 2 is a device that presents a smell to the user, and causes the user to perceive a specific smell, by releasing a smell substance. The smell presentation device 2 in the present embodiment is assumed to be detachably attached with a plurality of cartridges each of which is filled with a smell substance (a fragrance) that releases a specific smell. The smell presentation device 2, in response to a control signal from the information processing device 10, releases the smell substance enclosed in a specific cartridge. With this arrangement, the smell presentation device 2 can present to the user a plurality of kinds of smell that correspond to the plurality of cartridges. Further, by replacing a cartridge attached to the smell presentation device 2, it is possible to present to the user various smells of which number exceeds a number of cartridges that are simultaneously attachable to the smell presentation device 2. As specific examples, cartridges that can be attached to the smell presentation device 2 may be the cartridges that release various kinds of smells such as food smells (fruit, coffee, curry, meat, etc.), smells of environments (soil, grass, forest, library, hospital, etc.), smells of materials (gunpowder, blood, beast, sweat, perfume, machinery, dust, etc.), sweet smells, and spicy smells.

The smell presentation device 2 may be structured to be attachable to a user's body (head, etc.). In this case, when the smell substance is arranged to be released near the user's nose, the user can clearly perceive the smell. Alternatively, the smell presentation device 2 may be incorporated in a casing of the information processing device 10. Further, the smell presentation device 2 may be fixedly installed, independently of the information processing device 10, in a room where the user is present. Further, the smell presentation device 2 may include wheels and a drive mechanism or the like, and may be configured to be able to run by itself on the floor. According to such a configuration, the smell presentation device 2 can change a position where the smell presentation device 2 releases the smell substance, in accordance with control by the information processing device 10.

The smell presentation device 2 can release, in various ways, the smell substance in a cartridge. As a specific example, the smell presentation device 2 may dissipate the smell substance in the cartridge, in an atomized shape by a spray or the like. Also, when the smell presentation device 2 is attached to the user's body, the smell presentation device 2 may be arranged such that the smell substance in the cartridge is absorbed in a liquid-absorbable liquid-absorbing material (such as a filter paper). By moving this liquid-absorbing material close to the user's nose, the smell of the smell substance evaporated from the liquid-absorbing material may be presented to the user. Note that the smell presentation device 2 controls the intensity of the smell to be presented to the user, by adjusting the amount of the smell substance to be released or by adjusting a distance from the liquid-absorbing material soaked with the smell substance to the user. That is, when it is desired to cause the user to perceive a stronger smell, the smell presentation device 2 may increase the amount of the smell substance to be released, or move the liquid-absorbing material soaked with the smell substance closer to the user's nose.

The operation device 3 is a device that receives an operation input from the user. The operation device 3 inputs to the information processing device 10 a signal which indicates the content of the operation received from the user. The operation device 3 may be a controller or a keyboard for a home-use game machine, for example. The operation device 3 may include a button or the like arranged on the surface of the casing of the information processing device 10.

The display device 4 is an organic electroluminescence (EL) display or a liquid crystal display, and displays on a screen an image corresponding to a video signal output from the information processing device 10. The display device 4 may be a type of device used by being attached to the user's head, such as a head-mounted display. The display device 4 may be configured by being integrated with the casing of the information processing device 10.

The environment sensor 5 is disposed near the smell presentation device 2, and detects various information on the environment in which the smell presentation device 2 is used. Specifically, the environment sensor 5 may include sensors that detect a temperature, humidity, illuminance, airflow, etc. around the smell presentation device 2. The environment sensor 5 may include a smell sensor that detects a smell. By using the smell sensor, it is possible to measure presence of and the amount of a smell substance released from the smell presentation device 2. The environment sensor 5 may also include a positioning sensor that measures an installation position of the smell presentation device 2. The positioning sensor can be realized by a global positioning system (GPS) module, a wireless LAN module, or a similar module.

The vital sensor 6 detects various information on the state of the user's body who uses the information processing device 10. Specifically, the vital sensor 6 may include a sensor that detects the user's heart rate, pulse rate, perspiration amount, SpO2 (oxygen saturation of arterial blood), body temperature, respiration rate, presence or absence of speech. The vital sensor 6 may also include a sensor that is used in contact with the user, or a sensor that is used in non-contact. The vital sensor 6 of non-contact may include a camera that photographs a state of the user. By analyzing an image photographed by the camera, it is also possible to detect a user's facial expression, for example.

The server device 7 is a server computer that stores a database concerning the smell substance that the smell presentation device 2 releases. Hereinafter, the database stored in the server device 7 will be called a smell substance database. The server device 7 provides information of the smell substance database stored in the server device 7, in response to a request from the information processing device 10. The smell substance database may include information of various smell substances that can be released by the smell presentation device 2, including smell substances not actually attached to the smell presentation device 2.

FIG. 2 depicts an example of contents of the smell substance database. In the example in this drawing, for each of smell substances that the smell presentation device 2 can release, substance identification (ID), substance name, manufacturer name, smell type information, reference smell intensity value, correction information, and interaction information are stored in the smell substances database. The substance ID is identification information for identifying a smell substance, and the substance ID may be a management number of a corresponding cartridge. Incidentally, the substance name is a name of a smell substance, and the manufacturer name is a name of a manufacturer that provides a cartridge which includes the smell substance.

The smell type information is information indicating a characteristic of a smell, such as, what type of smell the smell substance has, what kind of environment or substance has this smell, and what kind of effect the smell has. The smell type information is an expression of a type of smell that an application program to be described later can specify. For example, the smell type information is represented by a keyword that is determined in advance. A plurality of pieces of smell type information may be associated with one smell substance.

The reference smell intensity value is an index value representing intensity of the smell as a reference in the case of releasing the smell substance. When the intensity of the smell is not specified by the application program, the smell presentation device 2 presents the intensity in accordance with the reference smell intensity value.

The correction information is information which is used to determine, in accordance with a using state of the smell presentation device 2, a degree of correction in correcting the intensity of the smell. Specifically, the correction information may include an application condition for applying a correction, and a correction coefficient to be added to or subtracted from or to be multiplied to a value that specifies the intensity of the smell when the application condition is satisfied. A specific example of the correction information will be described later.

The interaction information is information indicating a relationship between smell substances in the case of releasing a plurality of smell substances at the same time. Some smell substances have a characteristic of mutually enhancing or weakening effects. Some smell substances should not be used at the same time because chemical reactions or the like are generated. The interaction information includes a substance ID of other smell substance with which a smell substance concerned has a possibility of generating such interaction, and information on a type of interaction generated between the smell substance concerned and the other smell substance. In the example in FIG. 2, types of interaction are expressed such that a smell substance with which the smell substance concerned enhances the effect is indicated by a symbol "+," a smell substance with which the smell substance concerned weakens the effect is indicated by a symbol "-," and a smell substance with which the smell substance concerned cannot be used at the same time is indicated by a symbol "N." Further, the interaction information may include information which indicates a degree of influence, when smell substances have characteristics of mutually enhancing the effect or when smell substances have characteristics of mutually weakening the effect.

Figure 3:
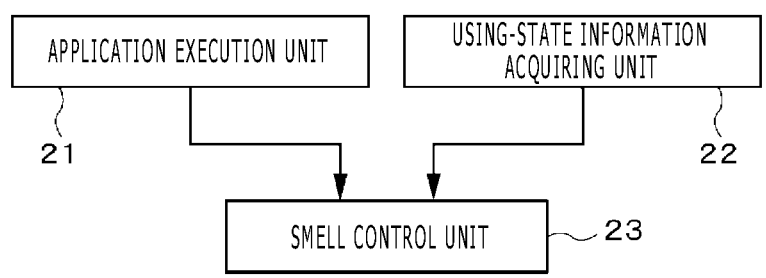
FIG. 3 is a functional block diagram depicting functions of the information processing device according to the embodiment of the present invention.

Next, functions realized by the information processing device 10 will be described with reference to FIG. 3. As depicted in FIG. 3, the information processing device 10 functionally includes an application execution unit 21, a using-state information acquiring unit 22, and a smell control unit 23. These functions are realized by the control unit 11 executing a program stored in the storage unit 12. This program may be provided to the information processing device 10 via a communication network such as the internet, or may be provided by being stored in a computer-readable information storage medium such as an optical disk.

The application execution unit 21 is realized by the control unit 11 executing the application program. In the present embodiment, it is assumed that the processing executed by the application program includes processing of presenting a smell to the user. Specifically, the application execution unit 21 may execute a game program or the like. The application execution unit 21 requests the smell presentation device 2 to present a smell, along with the progress of the processing content. Hereinafter, the request issued by the application execution unit 21 to the smell presentation device 2 will be referred to as a smell presentation request.

It is assumed that the smell presentation request includes smell specifying information for specifying a type of smell to be presented. In this case, the smell specifying information may be information such as a substances ID that uniquely identifies a type of cartridge attached to the smell presentation device 2, and a cartridge number. Alternatively, the smell specifying information may be information such as a keyword that is set as smell type information in the smell substance database, not directly associated with a cartridge attached to the smell presentation device 2. Further, the smell presentation request may include an index value that specifies the intensity of a smell (hereinafter, referred to as a smell intensity value). For example, the application execution unit 21, depending on the processing content, specifies a large number as a smell intensity value when it is desired to cause the user to perceive a strong smell, and specifies a small number as a smell intensity value when it is desired to cause the user to perceive a weak smell.

In the present embodiment, the smell presentation device 2 presents a smell to the user by finally releasing the smell substance in response to the smell presentation request. The content of the smell presentation request is determined according to the processing content of the application program. However, there is a possibility that the content of the smell presentation request is not the content which takes into account the using state of the smell presentation device 2. Therefore, in the present embodiment, the using-state information acquiring unit 22 acquires information on the using state of the smell presentation device 2 (hereinafter, referred to as using-state information). The smell control unit 23 determines in what mode the smell presentation device 2 is to be made to present a smell, in accordance with the content of the smell presentation request and the using-state information acquired by the using-state information acquiring unit 22. The smell control unit 23 outputs a control signal that matches the determined content, to the smell presentation device 2. With this arrangement, it is possible to operate the smell presentation device 2 in the content that matches the using state.

Specifically, the using-state information acquiring unit 22 acquires the using-state information when necessary, and notifies the content to the smell control unit 23. The using-state information is information on the state of actually using the smell presentation device 2. Before the use of the smell presentation device 2 is started, the content is not established, and the information includes the content determined at the start of using the smell presentation device 2 and includes the content that changes during the use. The using-state information may include information that identifies a user who is currently using the system (user identification information), environment information of the smell presentation device 2 detected by the environment sensor 5, and vital information of the user detected by the vital sensor 6. The content of the using-state information and a specific example of smell control in accordance with the content of the using-state information will be described later.

The smell control unit 23 determines the actual control content of the smell presentation device 2, in accordance with a smell presentation request output from the application execution unit 21 and using-state information acquired by the using-state information acquiring unit 22. Then, the smell control unit 23 instructs the smell presentation device 2 to release the smell substance in the determined content. With this arrangement, the smell presentation device 2 can release the smell substance in the mode corrected in accordance with the using-state information.

Specifically, first, the smell control unit 23 determines the smell substance (that is, a type of cartridge to be used) that is to be released to the smell presentation device 2, in accordance with the content of smell specifying information included in the smell presentation request. When the smell specifying information is information that does not directly specify the smell substance but includes a keyword representing the type of smell, in order to determine the smell substance used, the smell control unit 23 acquires information from the smell substance database stored in the server device 7. Specifically, the smell control unit 23 transmits to the server device 7 the smell specifying information included in the smell presentation request (a keyword), for example. The server device 7 refers to the smell substance database, and returns information including the substance ID associated with the smell type information that matches the smell specifying information. As a result, the smell control unit 23 can determine the smell substance to be used. Note that the smell control unit 23, at the time of starting the use of the information processing device 10, may acquire from the server device 7 in advance and stores as cache information in the storage unit 12, the information stored in the smell substance database for the smell substance corresponding to the cartridge that is attached to the smell presentation device 2. With this arrangement, the smell control unit 23 can determine the smell substance to be used by referring to the cache information, without performing an inquiry to the server device 7 each time when processing the smell presentation request.

Subsequently, the smell control unit 23 corrects the smell intensity value specified in the smell presentation request, in accordance with the content of the using-state information and the content of the correction information in the smell substance database, and determines the actual smell intensity for the smell presentation device 2 to present the smell to the user (for example, the release amount of the smell substance). Incidentally, when a smell intensity value is not included in the smell presentation request, the smell control unit 23 may use, as a smell intensity value, the reference smell intensity value stored in the smell material database. Further, the smell control unit 23 may determine the timing of starting the release of the smell substance or the length of time of performing the release of the smell substance, in accordance with the content of the smell presentation request and the using-state information.

Figure 4:
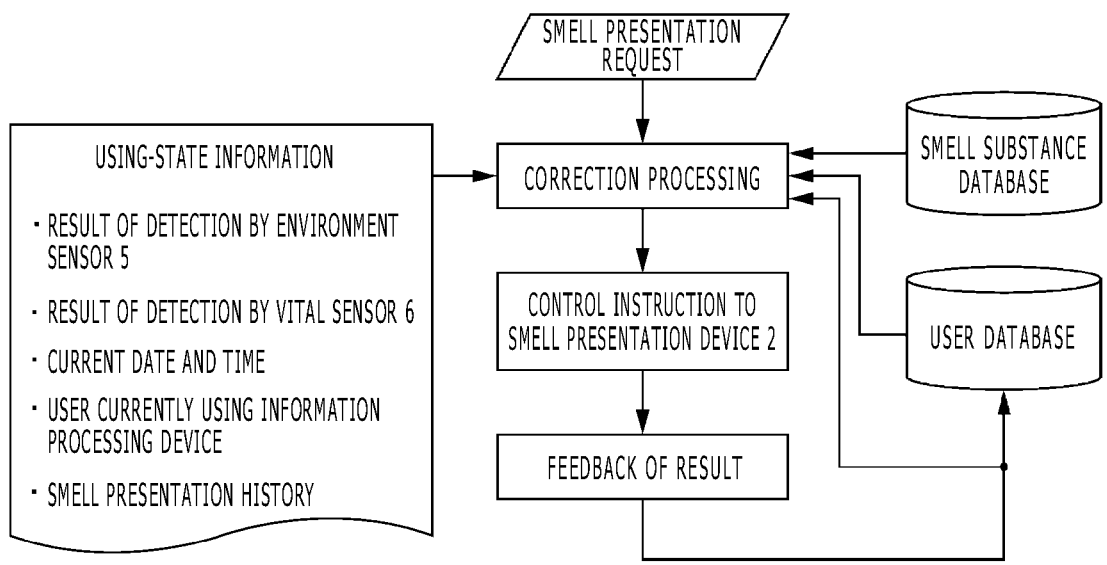
FIG. 4 is a diagram for explaining an overview of smell control that is realized by the information processing device according to the embodiment of the present invention.

FIG. 4 is a diagram for describing an overview of smell control by the smell control unit 23 described above. As depicted in the drawing, the smell control unit 23 receives the smell presentation request output by the application execution unit 21, and corrects parameters such as the smell intensity value included in the smell presentation request, in accordance with the using-state information acquired by the using-state information acquiring unit 22 and the content of the smell substance database acquired from the server device 7. In this case, the using-state information may include information of a result of detection by the environment sensor 5, a result of detection by the vital sensor 6, information of the current date and time, information identifying the user currently using the information processing device, and information of the past presentation history of smells, as described later. Also, the smell control unit 23 may perform correction by referring to the user database stored in the information processing device 10 (described later). Thereafter, the smell control unit 23 outputs a control instruction for making the smell presentation device 2 present a smell according to the corrected content.

Further, the smell control unit 23 may thereafter perform feedback processing for making the smell presentation device 2 change the content of the smell to be presented, by using a result of detection by the smell sensor after the smell presentation device 2 presents the smell, a result of detection by the vital sensor 6, and information input by the user. Specifically, the smell control unit 23 corrects parameters of smell control in accordance with a detection result when continuing the smell control, and reflects the detection result to the user database, for example. With this arrangement, the smell control unit 23 changes the content of the correction process in the case of presenting thereafter the smell of the same kind. According to such control, it is possible to adjust smells more finely by matching the using state and the user.

Hereinafter, specific examples of smell control according to the using-state information will be described.

As a first example, smell control according to the using environment of the smell presentation device 2 will be described. In the first example, the using-state information acquiring unit 22 acquires, as using-state information, the environment information detected by the environment sensor 5. The smell control unit 23 corrects the smell intensity value specified in the smell presentation request, on the basis of the acquired environment information. Specifically, the smell control unit 23 acquires correction information of a target smell substance, from the smell substance database, and determines whether or not the detected environment information satisfies the application condition for a correction included in the correction information. When it is decided that the detected environment information satisfies the application condition, the smell control unit 23 corrects the smell intensity value by using a correction coefficient associated with the application condition.

As an example, the correction information may include a content of multiplying a correction coefficient to a smell intensity value when the temperature is equal to or not more than a predetermined value. In this case, the smell control unit 23 uses the smell intensity value as it is when a detected temperature exceeds a predetermined value. However, when a detected temperature is equal to or not more than a predetermined value (that is, when used in a low temperature environment), the smell control unit 23 corrects the smell intensity value by using the correction coefficient included in the correction information. Also, the smell control unit 23 may perform a correction of increasing the smell intensity value when the air flow is large at the position where the smell presentation device 2 is used (that is, when there is a flow of air). Also, the smell control unit 23 may perform a correction of increasing the smell intensity value when it is already detected by the smell sensor that there is some smell around the smell presentation device 2.

Next, as a second example, smell control according to vital information of the user will be described. In the second example, the using-state information acquiring unit 22 acquires, as using-state information, vital information of the user detected by the vital sensor 6. The smell control unit 23 corrects the smell intensity value specified in the smell presentation request, on the basis of the acquired vital information. The correction processing itself in this case may be similar to the first example described above. In order to realize such processing, the correction information of a smell substance may include information that associates the application condition on the vital information with the correction content when the application condition is satisfied. Specifically, when it is decided from the value of the vital information that there is an abnormality in the user's physical condition, for example, the smell control unit 23 may perform a correction of decreasing the smell intensity value.

Also, the smell control unit 23 may dynamically change the smell intensity value in accordance with the variation in vital information, while the smell is presented. Specifically, when the smell presentation device 2 releases a smell substance having a relaxing effect, for example, the using-state information acquiring unit 22 periodically acquires a result of detection by the vital sensor 6 while the release of the smell substance is performed. When it is decided from a result of detection by the vital sensor 6 that there is an effect of the release of the smell substance (that is, the user is relaxed), the smell control unit 23 controls to reduce the release amount of the smell substance. On the other hand, when it is decided that there is no effect, the smell control unit 23 controls to increase the release amount of the smell substance.

Next, as a third example, smell control according to a period will be described. In the third example, the using-state information acquiring unit 22 acquires information that indicates a period when a smell is presented (such as a time period and a season) as using-state information. Such information can be acquired by referring to date-and-time information counted by a clock unit of the information processing device 10. The smell control unit 23 refers to the information which indicates this period, and performs a correction of increasing or reduce a smell intensity value when presenting a smell in a specific period. With this arrangement, it is possible to perform control to prevent releasing a smell substance during a season when a person is susceptible to develop a seasonal hay fever, for example.

Next, as a fourth example, there will be described an example of a case where a mode of smell presentation is changed depending on which one of a plurality of users is using the information processing device 10 when the plurality of users share the information processing device 10. In the fourth example, it is assumed that users who use the information processing device 10 perform user registration in advance, and the users log into the information processing device 10 by inputting a user own ID or a user name at the start time of using the information processing device 10. With this arrangement, the information processing device 10 can understand which one of the plurality of users who register in advance is currently using the information processing device 10. The using-state information acquiring unit 22 acquires as using state information the information that identifies the user currently using the information processing device 10.

In the fourth example, the user database is stored in the memory unit 12. The user database includes user correction information that indicates a correction content inherent to a user, for each of the plurality of users (that is, user-registered users) who use the information processing device 10. It is assumed that the user correction information includes a parameter that indicates a reaction of the user with respect to a smell substance, for each smell substance that the smell presentation device 2 can release. This parameter may indicate whether the user is sensitive or insensitive to the smell, or may indicate whether the user feels comfortable or uncomfortable with the smell. FIG. 5 depicts an example of a user database. The database stores, as user correction information, parameters that represent stepwise whether each user feels comfortable or uncomfortable with each of a plurality of smell substances. The example in this drawing depicts that a parameter of a positive value indicates that the user feels comfortable with the smell and that a parameter of a negative value indicates that the user feels uncomfortable with the smell. The smell control unit 23, when presenting a smell substance to a user, refers to this parameter, and corrects a smell intensity value of the smell substance that is considered to give an uncomfortable feeling to the user. For the smell substance that the user feels comfortable, the smell intensity value may be corrected to be increased.

The content of the user correction information is determined by feeding back a user's response to a smell when the smell is actually presented to the user. Specifically, after actually releasing a specific smell substance to a user, the smell control unit 23 inquires the user relating to user's rating of this smell, for example. The user inputs the answer to this inquiry by operating the operation device 3. The smell control unit 23 receives the answer, and determines a parameter for the smell substance of the user. The smell control unit 23 may perform such enquiry relating to a smell substance which is released to the user for the first time, for example. Alternatively, the smell control unit 23 may periodically perform such enquiry at every predetermined number of times of releasing a specific smell substance, or after each predetermined period of time since the last enquiry.

Further, the smell control unit 23 may identify a user's reaction to the smell, on the basis of a result of detection by the vital sensor 6, instead of receiving the input of evaluation directly from the user, or in addition to receiving the input of evaluation directly from the user. The smell control unit 23 may determine a parameter to be stored in the database, in accordance with the result of identification. After the release of a certain smell substance, when there is a change that exceeds a predetermined standard in the vital information of the user, for example, it is considered that the user is sensitive to the smell substance. In such a case, it is desirable to reduce the release amount of the smell substance at the next time afterward. Therefore, when such a change in the vital information is detected, the smell control unit 23 stores in the user database a parameter that indicates that the user is sensitive to the smell substance. In the case of releasing the same smell substance at the next time afterward, the smell control unit 23 reads the user correction information from the user database, and performs the correction of decreasing the smell intensity value.

In the above description, a parameter is stored for each of the plurality of smell substances, in the user database. The smell control unit 23 may also store user correction information that does not depend on the type of smell substance, in the user database. For example, when a change in the vital information on the release of the smell substance as described above is observed in any smell substance, the user is assumed to be sensitive to the overall smell. Therefore, the smell control unit 23 may store in combination, in the user database, a representative value (for example, an average value) of the parameter determined for each smell substance as user correction information. When there is a smell substance that is released to the user for the first time, the smell control unit 23 may correct the smell intensity value by using the representative value.

The above plurality of examples of the method of correcting the smell intensity values may be used in combination. Specifically, for example, the smell control unit 23 may correct by overlapping the smell intensity values included in the smell presentation request, on the basis of the detection results of the environment sensor 5 and the vital sensors 6, and each of information identifying the user who is currently using the information processing device. Also, the smell control unit 23 may control, not only the smell intensity value, but also the smell presentation timing and the presentation time, on the basis of the using-state information. For example, when releasing a smell substance which the user is estimated to dislike according to the user database, the smell control unit 23 may perform a correction of shortening the presentation time (release time of the smell substance). Further, when releasing a smell substance of a characteristic which the user is not easily aware of, the smell control unit 23 may instruct the smell presentation device 2 to start smell presentation immediately after receiving the smell presentation request. When releasing a smell substance of a characteristic which the user is easily aware of, the smell control unit 23 may instruct the smell presentation device 2 to start smell presentation after a lapse of a predetermined delay time since receiving the smell presentation request. With the above arrangement, it is possible to control such that the user uniformly perceives the smells regardless of the characteristic of the smell substances.

Information of the delay time for each smell substance in this case may be stored in the smell substance database.

Also, the smell control unit 23 may output a control signal to the smell presentation request 2 after performing various adjustments to the content requested in the smell presentation request, other than performing the control based on the results of detection by the user or various sensors as described above. Specifically, the smell control unit 23 is required in some cases from the application execution unit 21 to release a plurality of types of smell substance in the same period. In such a case, the smell control unit 23 refers to the interaction information of the smell substance database, and decides whether or not there is interaction among the required plurality of types of smell substances. When a combination of smell substances that has a possibility of generating interaction is requested, the smell control unit 23 adjusts the smell intensity value at the time of releasing each smell substance, with reference to the interaction information. Specifically, when it is required to simultaneously use smell substances that mutually enhance the effect, the smell control unit 23 performs a correction of decreasing the smell intensity values of both smell substances. On the other hand, when it is required to simultaneously use smell substances that mutually weaken the effect, the smell control unit 23 performs a correction of increasing the smell intensity values of both smell substances. Further, when a combination of smell substances that cannot be used simultaneously is required, the smell control unit 23 controls to release only a smell substance of which a larger smell intensity value is specified, and not release the other smell substance, for example.

Also, the smell control unit 23 may change the control content of the smell presentation device 2 in accordance with the past smell presentation history. As a specific example, the smell control unit 23 records, as using-state information, the history of the content of control performed to the smell presentation device 2, after a user starts using the information processing device 10. When the past cumulative period of continuously releasing a smell substance has reached a predetermined time, or when the cumulative release amount of a smell substance has reached a predetermined amount, the smell control unit 23 may reduce the amount of a smell substance to be released, by performing a correction of decreasing the smell intensity value for a new smell presentation request, or may control to stop more releasing the smell substance. With this arrangement, it is possible to prevent excessively presenting a smell. Also, when the release time or the release amount of a smell substance in the most recent past predetermined period, not the accumulation from the start time of using, has reached a predetermined value, the smell control unit 23 may perform a similar control.

In the above description, the smell control unit 23 changes the instruction content to the smell presentation device 2 in accordance with the using-state information. Alternatively, the application execution unit 21 may change the smell specifying information and the information of the smell intensity value included in the smell presentation request in accordance with the using-state information. As a specific example, the application execution unit 21 executes in some cases the application program for realizing aromatherapy. In this case, the application execution unit 21 issues a smell presentation request to present a smell having a relaxing and refreshing effect to the user. The content of the smell presentation request in this case may be determined in accordance with a result of detection by the environment sensor 5 or by the vital sensor 6. For example, when it is estimated from the result of detection by the vital sensor 6 that the user is in a tension state, the application execution unit 21 includes, in the smell presentation request, smell designation information for designating a smell substance having a stronger effect, or sets in a large value the smell intensity value to be included in the smell presentation request. With this arrangement, it is possible to present a smell that matches a user's state. Such an application program may acquire schedule information that the user has registered as using-state information in a calendar application, and select the content of the smell presentation request in accordance with the content. In this case, the application execution unit 21 acquires information of the execution date of the application program, and acquires schedules of the execution date and the day after the execution date. Then, by matching the content, the application execution unit 21 determines a type of smell and a smell intensity value to be presented to the user.

According to the information processing device 10 according to the present embodiment as described above, by controlling, according to the using-state information, the intensity of a smell when presenting the smell, the smell presentation time, and the presentation timing, it is possible to present the smell to the user in a mode suitable to the using state of the information processing device 10. Further, by adjusting the release amount of a smell substance in accordance with the user, it is possible to save the consumption of the smell substance, while ensuring the intensity that enables the use to feel the smell.

The embodiment of the present invention is not limited to that described above. For example, the smell substance database provided by the server device 7 in the above description may be stored in advance in the information processing device 10. In this case, the information processing device 10 can realize the smell control described above, without being necessarily externally connected to the server device 7 for communication. Conversely, the content of the user database stored in the storage unit 12 of the information processing device 10 in the above description may be uploaded to an external server device. With this arrangement, in the case where one user uses a plurality of the information processing devices 10, when the user uses any one of the information processing devices 10, the information processing device 10 can authenticate the user who uses the information processing device 10, and can utilize the user database stored in the server device so that the information processing device 10 can adjust the smell to suit the user.

In the above description, the information processing device 10 that is used near the user together with the smell presentation device 2 determines the content of control of the smell presentation device 2. Alternatively, the server device 7 may determine the content of smell control for the smell presentation device 2. In this case, the server device 7 realizes the functions of the smell control unit 23 described above. That is, the server device 7 acquires the using-state information from the information processing device 10, determines the operation content of the smell presentation device 2 according to the content, and transmits to the information processing device 10 the control instruction for operating the smell presentation device 2 in accordance with the determined operation content. In this case, the function of the application execution unit 21 may be realized by the server device 7. Alternatively, the information processing device 10 may execute the application program, and notify the server device 7 with the content of the smell presentation request that is output as a result. The server device 7 may receive the notification, and determine the control content for the smell presentation device 2.

In this case, the server device 7 may be connected to a plurality of the information processing devices 10, and acquire the position information of each information processing device 10, as one of pieces of the using-state information. In this example, the information processing device 10 transmits the position information measured by the positioning sensor to the server device 7, in a timing when the use of the information processing device 10 is started. The server device 7, on the basis of the position information transmitted from each of the plurality of information processing devices 10, determines whether or not two or more information processing devices 10 are used at the same time within a predetermined distance range. When outputting a control instruction to one of the information processing devices 10 (a focused information processing device) to present a smell, the server device 7 determines the content of the control instruction to the focused information processing device, by reflecting the operation state (a smell presentation state) of a separate one of the information processing devices 10, when the separate one of the information processing devices 10 is being used within a predetermined distance range from the focused information processing device. More specifically, when the smell presentation control is being performed to the separate information processing device 10, for example, the server device 7 decides whether or not there is interaction as described above between the smell substance and a smell substance which is going to be presented by the focused information processing device. Then, depending on a result of the decision, the server device 7 performs a correction of stopping the smell-presentation control instruction to the focused information processing device, or changing the smell intensity value. According to such control, when a plurality of the information processing devices 10 are used at the same place at the same time, the content and the intensity of a smell to be presented from the smell presentation device 2 connected to each of the plurality of information processing devices 10 can be adjusted according to each operation state.

REFERENCE SIGNS LIST

1 Smell presentation system, 2 Smell presentation device, 3 Operation device, 4 Display device, 5 Environment sensor, 6 Vital sensor, 7 Server device, 10 Information processing device, 11 Control unit, 12 Storage unit, 13 Interface unit, 21 Application execution unit, 22 Using-state information acquiring unit, 23 Smell control unit

The invention claimed is:

1. An information processing device that controls a smell presentation device which presents a smell to a user, the information processing device comprising:
   an using-state information acquiring unit that acquires information on a using state of the smell presentation device;
   a temperature sensor that detects a temperature value of an environment around the smell presentation device; and
   a smell control unit that
      receives a smell presentation request from an application program,
      causes the smell presentation device to present a smell identified in the smell presentation request at an intensity value which is adjusted in accordance with the acquired information on the using state, and
      in response to the temperature value exceeding a predetermined value, applies a correction coefficient to correct the intensity value of the presented smell.

2. The information processing device according to claim 1,
   wherein the smell control unit determines, in accordance with the acquired information on the using state, at least one of a length of time to release the presented smell and a timing of starting the release of the presented smell.

3. The information processing device according to claim 1,
   wherein the information processing device is connected to a sensor that detects information of the environment around the smell presentation device, and
   wherein the using-state information acquiring unit acquires the information of the environment as information on the using state.

4. The information processing device according to claim 1,
   wherein the information processing device is connected to a sensor that detects information of a state of a body of the user, and
   wherein the using-state information acquiring unit acquires the information of the state of the body as information on the using state.

5. The information processing device according to claim 1,
   wherein the using-state information acquiring unit acquires information which indicates a correction content at time of presenting a smell to the user, from a user database that stores information which indicates the correction content, by associating the using-state information acquiring unit with each of a plurality of users who use the information processing device,
   wherein the using-state information acquiring unit acquires, as information on the using state, information which identifies a user who is currently using the information processing device out of the plurality of users, and
   wherein the smell control unit causes the smell presentation device to present a smell, in a mode determined in accordance with a correction content indicated by information stored in the user database associated with the user who is currently using the information processing device.

6. The information processing device according to claim 1,
   wherein the smell presentation device is configured to release a plurality of types of smell substances,
   wherein, in association with each of the plurality of types of smell substances, the using-state information acquiring unit acquires, at time of releasing a smell substance, information indicating a correction content in accordance with information on the using state, from a smell substance database that stores information indicating the correction content, and
   wherein the smell control unit causes the smell presentation device to present a smell, in a mode determined in accordance with a correction content indicated by information stored in the smell substance database in association with a smell substance that is going to be released to present a smell, and in accordance with information on a using state acquired by the using-state information acquiring unit, wherein, for each smell substance in the smell substance database, the information includes positive, neutral, or negative interactions with other smell substances in the smell substance database.

7. An information processing method for controlling a smell presentation device that presents a smell to a user, the information processing method comprising:
- acquiring information on a using state of the smell presentation device;
- detecting a temperature value of an environment around the smell presentation device;
- receiving a smell presentation request from an application program;
- causing the smell presentation device to present a smell identified in the smell presentation request at an intensity value which is adjusted in accordance with the acquired information on the using state; and
- in response to the temperature value exceeding a Predetermined value, applying a correction coefficient to correct the intensity value of the presented smell.

8. A non-transitory computer-readable information storage medium that stores a program for controlling a smell presentation device that presents a smell to a user, the program comprising:
- by an using-state information acquiring unit, acquiring information on a using state of the smell presentation device;
- by a temperature sensor, detecting a temperature value of an environment around the smell presentation device; and
- by a smell control unit,
  - receiving a smell presentation request from an application program,
  - causing the smell presentation device to present a smell identified in the smell presentation request at an Intensity value which is adjusted in accordance with the acquired information on the using state, and
  - in response to the temperature value exceeding a predetermined value, applying a correction coefficient to correct the Intensity value of the Presented smell.

* * * * *